June 7, 1949.  W. KLEIN ET AL  2,472,330
WEED ERADICATING MACHINE
Filed Jan. 22, 1946  3 Sheets-Sheet 1
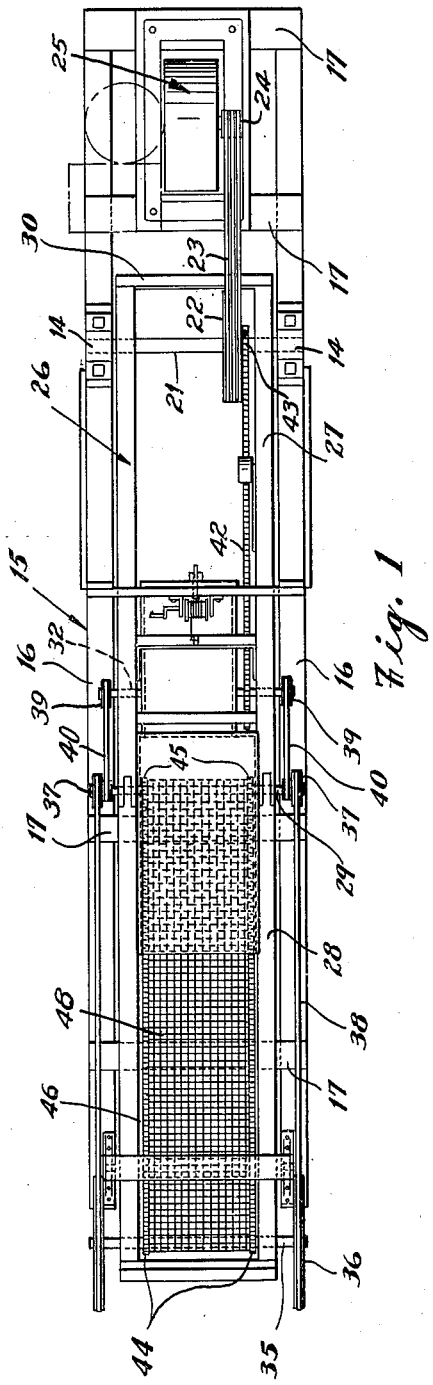
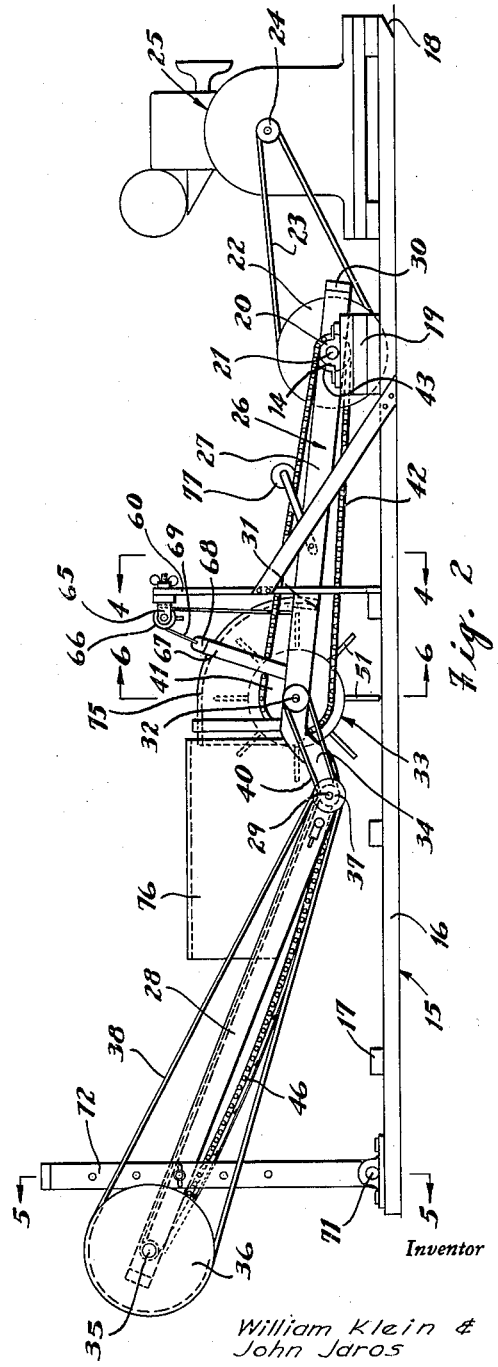
Inventor
William Klein &
John Jaros
By Clarence A. O'Brien
and Harvey B. Jacobson
Attorneys

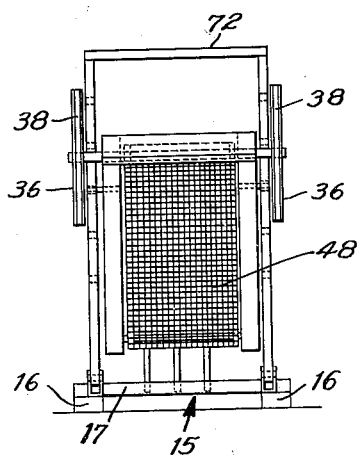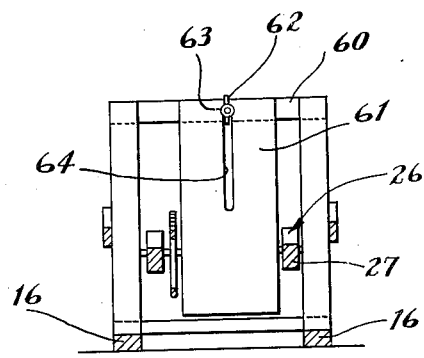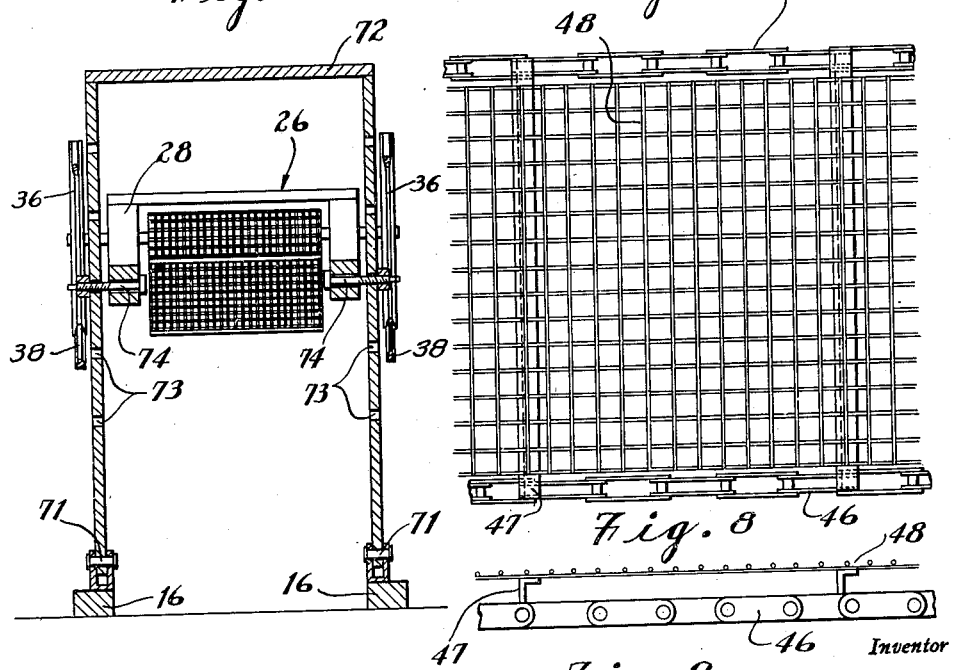

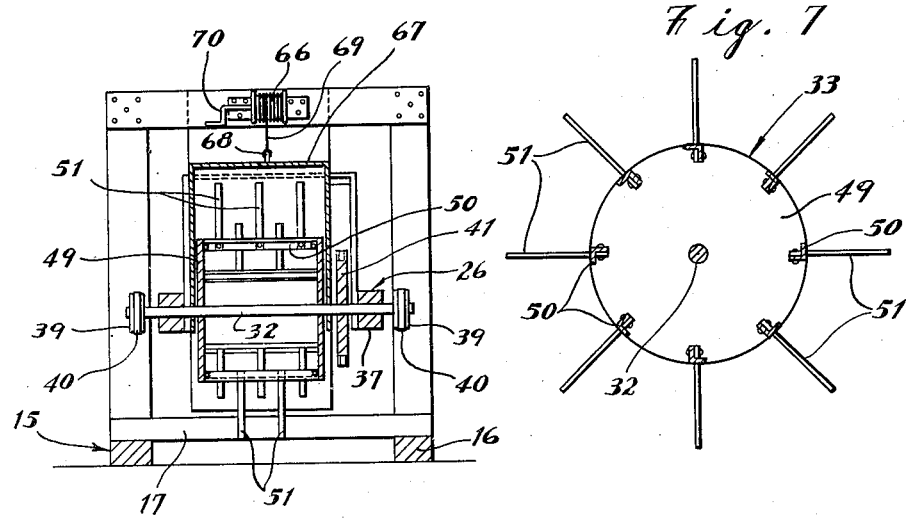

Patented June 7, 1949

2,472,330

UNITED STATES PATENT OFFICE 2,472,330

WEED ERADICATING MACHINE

William Klein and John Jaros, Warroad, Minn.

Application January 22, 1946, Serial No. 642,623

5 Claims. (Cl. 97—10)

This invention relates to a soil combine and more particularly to a device for destroying quack grass roots and other weed plants.

The primary object of the invention is to extract the weeds and the roots thereof from the soil from which they grow and to separate the soil from the roots, depositing the soil on the ground and delivering the weeds and root to a point where they may be conveniently collected and destroyed, or dropped on top of the ground.

Another object is to enable such weeding to be accomplished between rows of standing crops without in any way injuring the latter.

The above and other objects may be accomplished by employing this invention which embodies among its features a drag frame or carriage, on articulated frame pivotally supported near the forward end of the carriage, a drum rotatably supported intermediate the ends of the articulated frame, radial weeding teeth carried by the drum, a movable screen mounted in the frame at the rear of the drum, and means to rotate the drum and move the screen in unison.

Other features include means for supporting the drum in various positions to facilitate the engagement of the weeding teeth with the soil to be treated, and means to adjust the angle of the movable screen to control the extraction and separation process.

Still other features include a gate or guard mounted in advance of the drum to force the soil and its contents upward and through the hood above the rotating teeth and also to protect the weeding teeth from injury through contact with stones and the like, and a novel means for mounting the weeding teeth to avoid breakage thereof should a stone or similar obstacle be encountered thereby.

In the drawings:

Figure 1 is a top plan view of a weeder embodying the features of this invention, Figure 2 is a side view of Figure 1, Figure 3 is a rear end view of Figure 1, Figure 4 is a transverse sectional view taken substantially on the line 4—4 of Figure 2, Figure 5 is a transverse sectional view taken on the line 5—5 of Figure 2 on a somewhat enlarged scale, Figure 6 is a transverse sectional view taken substantially on the line 6—6 of Figure 2 on a slightly enlarged scale, Figure 7 is an enlarged sectional view through the drum illustrated in Figures 1 and 2, Figure 8 is an enlarged plan view of a fragment of the movable screen, Figure 9 is an edge view of Figure 8.

Referring to the drawings in detail a base frame or carriage designated generally 15 comprises a pair of side bars 16 held in spaced parallel relation by means of cross-bars 17 which extend transversely of the carriage in spaced longitudinal relation one to the other. The forward ends of the side bars 16 are beveled as in 18 so that the bars 16 form in effect a skid upon which the super-structure to be more fully hereafter described is mounted. Mounted on each side bar 16 nearer its forward end is a bracket 19 supporting a journal bearing 14 in which a main drive shaft 21 is rotatably mounted. This drive shaft is provided with a suitable pulley 22 which has driving connections by means of a belt or belts 23 with the drive pulley 24 of a prime mover designated generally 25 mounted adjacent the forward ends of the side bars 16 and which may take the form of an internal combustion engine.

Pivotally mounted about the drive shaft is an articulated frame designated generally 26. This frame comprises a front section 27 and a rear section 28 the junctions of which are pivotally connected about a transversely extending shaft 29 the purpose of which will more fully hereinafter appear. The frame 27 comprises spaced parallel side bars joined at their forward ends by a cross-member 30 which cooperates with a transversely extending cross-member 31 in holding the side bars of the frame 27 in spaced parallel relation. Mounted for rotation near the rear ends of the side bars of the frame 27 is a shaft 32 carrying a weeder drum designated generally 33 to be more fully hereinafter described. As illustrated in Figure 2 the rear ends of the side bars of the frame 27 are downwardly off-set as at 34 so that the axis of the shaft 29 will be below the axis of the shaft 32 in order that weeds delivered to the moving screened belt to be more fully hereinafter described may be deposited thereon from above by the weeding teeth to be more fully hereinafter described. Supported near the rear ends of the side bars forming the frame 28 is a shaft 35 carrying adjacent opposite ends drive pulleys 36 by means of which the shaft 35 is rotated.

Mounted for independent rotation on opposite ends of the shaft 29 are stepped pulleys 37 the larger of each of which has driving connection with its respective pulley 36 through the medium of a drive belt 38. A drive pulley 39 is mounted on each end of the shaft 32 for rotation therewith and each of these pulleys has driving connection with its respective pulley 37 through the medium of an endless belt 40. Connected to the shaft 32 for rotation therewith is a sprocket 41 over which a chain 42 having driving connection with a sprocket 43 which is mounted to rotate with the shaft 21 is trained. It will thus be seen that when the drive pulley 24 of the prime mover 25 is set into operation the shafts 21, 32, 29 and 35 will be driven. It is further to be noted that inasmuch as the drive sprocket 43 and the drive pulleys 37 are rotatable about the same axes about which the articulated frame sections 27 and 28 of the articulated frame 26 are pivoted, the various elements will be driven irrespective of the angular relation of the frame sections 27 and 28 with relation to one another and with relation to the carriage 15.

Mounted for rotation with the shaft 35 are drive sprockets 44 which cooperate with idler sprockets 45 mounted for rotation about the shaft 29 in supporting endless chains 46. These chains are held in spaced parallel relation not only by the sprockets 44 and 45 but also by cross-members 47 (Figs. 8 and 9) upon which an endless screen 48 is supported. It will be understood that the screen 48 may be of any suitable type which will permit it to follow the chains 46 though the hinged link type of screen is preferred.

The weeder drum 33 previously referred to is best illustrated in Figure 7 and in its preferred form comprises a pair of spaced discs 49 the peripheries of which are connected by transversely extending angle bars 50 to which radial weeder teeth 51 are secured. As shown in Figure 6 the teeth 51 are arranged in alternately staggered relation in order to facilitate the loosening of the earth and the extraction of the weeds therefrom.

Mounted intermediate the ends of the side bars 16 of the carriage 15 and at point slightly in advance of the extreme forward ends of the weeder teeth carried by the drum 33 is an inverted U-shaped frame 60 upon which is supported a vertically adjustable gate 61 which may be held in various positions by means of a wing nut 62 operating on a bolt 63 which projects through the bight portion of the frame 60 and a slot 64 formed in the gate 61. Also carried by the bight portion of the inverted U-shaped frame 60 is a yoke 65 in which a windlass 66 is supported. An inverted U-shaped yoke 67 is pivotally attached to the shaft 32 and the upper end of the yoke is provided with an upstanding ear 68 to which a cable 69 is secured. The end of the cable opposite that which is secured to the ear 68 is wound about the drum of the windlass 66 and attached thereto so that by rotating the drum the rear end of the frame 27 may be raised or lowered in order to adjust the engagement of the weeder teeth 51 with the earth being treated. The windlass 66 is provided with the usual hand crank 70 and is preferably provided with any suitable conventional locking means to hold the cable against unwinding movement.

Pivotally attached as at 71 adjacent the rear ends of the bars 16 are the lower ends of the legs of an inverted U-shaped frame 72. The legs of the frame 72 are provided with aligning openings 73 arranged in vertically spaced relation for the reception of adjusting bolts 74 which extend through apertures in the side bars of the rear frame member 28 of the articulated frame 26 in order to support the rear end of the frame member in proper elevated position. It is obvious that the bolts 74 may be thrust through the openings 73 at different points of elevation in order that the discharge end of the screen 48 may be properly located.

A hood 75 partially enshrouds the upper portion of the drum 33 with its lower forward end attached to the member 31 while the rear end opens into a longitudinally extending hood 76 which partially encloses the forward end of the screen conveyor 48. The hood 75 cooperates with the weeder arms 51 in elevating the extracted soil weeds and roots from the earth and depositing them onto the screen conveyor 48 inside of hood 76 while the hood 76 serves to confine the soil and its contents to be separated by the conveyor screen 48. Besides serving as above described, cross-member 31 also serves as a crusher bar to prevent lumps and clods from being carried over cylinder before being fully pulverized.

In operation it will be understood that the carriage 15 is moved along the area to be weeded and the prime mover 25 set into motion whereupon the drum 33 will be driven in the direction opposite to the direction the machine is moved and cause the weeding teeth 51 to dig up the surface of the ground and elevate the weeds with their roots, and soil as described above. The depth to which the teeth 51 may operate is regulated by the windlass 66 and the height to which the weeds are carried by the screen 48 is regulated by adjustment of the bolts 74 in the openings 73. It is obvious that the frame member 27 may be raised or lowered without altering the adjustment of the rear end of the frame 28, and likewise the rear end of the frame 28 may be raised or lowered without altering the adjustment of the frame 27. In this way great flexibility of operation may be attained and the utility of the device is therefore greatly enlarged. Should it be found desirable a suitable chain tightener 77 may be attached to one of the side bars of the frame 27 in order to keep the chain 42 under the proper tension.

While in the foregoing there has been shown and described the embodiment of this invention it is to be understood that preferred minor changes in the details of construction, combination, and arrangement of parts may be resorted to without departing from the spirit and scope of the invention as claimed.

We claim:

1. A weeder comprising a carriage, an articulated frame pivoted at its forward end to the carriage, a weeding drum rotatably mounted on the frame intermediate its ends, means carried by the carriage for raising or lowering the mid-portion of the articulated frame, a movable screen mounted in the frame at the rear of the drum, means on the carriage to support the rear end of the frame in vertically adjusted position and means on the carriage to rotate the drum and move the screen in unison.

2. A weeder comprising a carriage, an articulated frame pivoted at its forward end to the carriage, a weeding drum rotatably mounted on the frame intermediate its ends, a movable screen mounted in the frame at the rear of the drum, means to rotate the drum and move the screen in unison, means on the carriage to support the intermediate portion of the frame for adjustment about the pivot and means at the rear end of the carriage to support the rear end of the frame in spaced relation to the carriage.

3. A weeder comprising a carriage, an articulated frame pivoted at its forward end adjacent the forward end of the carriage, a weeding drum rotatably mounted on the frame intermediate its ends, a movable screen mounted in the frame at the rear of the drum, means to rotate the drum and move the screen in unison, means to support the intermediate portion of the frame for adjustment about the pivot, means on the carriage to support the rear end of the frame for adjustment vertically with relation to the carriage and a guiding hood partially enshrouding the drum and the forward end of the screen.

4. A weeder comprising a carriage, a prime mover mounted adjacent the forward end of the carriage, a frame pivoted at its forward end to the carriage near the prime mover to swing about a horizontal axis, a weeding drum mounted for rotation near the rear end of the frame, a movable screen pivoted at its forward end to the rear end of the frame, means establishing driving connection between the prime mover, the drum and the screen, means intermediate the ends of the carriage to raise or lower the rear end of the frame and means pivoted adjacent the rear end of the carriage to support the rear end of the movable screen for adjustment vertically relative to the carriage.

5. A weeder comprising a carriage, a frame pivoted at its forward end to swing about a horizontal axis near the forward end of the carriage, a weeding drum mounted to rotate near the rear end of the frame, a movable screen pivotally supported on the rear end of the frame to swing about an axis which lies parallel to the axis about which the frame swings, an upwardly extending supporting frame pivoted adjacent the rear end of the carriage to rock about an axis which lies parallel to the first mentioned axis and vertically adjustable means pivotally coupling the movable screen to the upwardly extending supporting frame.

WILLIAM KLEIN.
JOHN JAROS.

REFERENCES CITED

The following references are of record in the file of this patent:

UNITED STATES PATENTS

| Number | Name | Date |
| --- | --- | --- |
| 40,786 | Wheeler | Dec. 1, 1863 |
| 1,047,262 | Matejowitz | Dec. 17, 1912 |
| 1,147,241 | Henderson | July 20, 1915 |
| 1,611,919 | Kilborn | Dec. 28, 1926 |
| 1,786,388 | Beaudry | Dec. 23, 1930 |
| 1,850,357 | Pitcher | Mar. 22, 1932 |
| 2,007,646 | Gilbertson | July 9, 1935 |

FOREIGN PATENTS

| Number | Country | Date |
| --- | --- | --- |
| 13,194 | Denmark | May 2, 1910 |
| 67,403 | Hungary | July 9, 1915 |